(12) United States Patent
Sela et al.

(10) Patent No.: US 8,958,328 B2
(45) Date of Patent: Feb. 17, 2015

(54) LOAD BALANCING

(75) Inventors: Sarig Sela, Karkur (IL); Mordekhay Goldshtein, Hod-Hasharon (IL); Magal Pinchas, Tel-Aviv (IL); Snir Brener, Petah-Tikva (IL); Rafi Heiman, Ramot-Hashavim (IL)

(73) Assignee: Gilat Satellite Networks Ltd., Petah Tikva (IL)

( * ) Notice: Subject to any disclaimer, the term of this patent is extended or adjusted under 35 U.S.C. 154(b) by 203 days.

(21) Appl. No.: 13/610,108

(22) Filed: Sep. 11, 2012

(65) Prior Publication Data

US 2013/0077490 A1    Mar. 28, 2013

Related U.S. Application Data

(60) Provisional application No. 61/540,195, filed on Sep. 28, 2011.

(51) Int. Cl.
*H04W 84/06* (2009.01)
*H04B 7/185* (2006.01)

(52) U.S. Cl.
CPC .................................. *H04B 7/1858* (2013.01)

USPC ............ 370/252; 370/316; 370/343; 370/480

(58) Field of Classification Search
None
See application file for complete search history.

(56) References Cited

U.S. PATENT DOCUMENTS

| 5,898,681 A * | 4/1999 | Dutta ............................ 370/229 |
| 2010/0202371 A1 * | 8/2010 | Josiam et al. ................. 370/329 |

* cited by examiner

*Primary Examiner* — Alex Skripnikov
(74) *Attorney, Agent, or Firm* — Banner & Witcoff, Ltd.

(57) ABSTRACT

A satellite communication system comprising a hub and plurality of terminals may be divided into multiple segments, wherein each segment may support part of the terminals. A method for decentralized balancing of traffic between the system segments is presented herein. One segment in each coverage beam may be designated as home carrier and include load balancing information. The terminals may be configured to tune on a home carrier, receive the load balancing information and then use it for selecting a least loaded segment on which they may remain operational until reset or powered off. In some embodiments of the invention, said load balancing information may be used for calculating relative probabilities for selecting segments through a weighted random selection algorithm.

31 Claims, 5 Drawing Sheets

Table 420:

| Network Segment ID | Traffic Processor ID | Weight |
|---|---|---|
| 200a | 1 | 70 |
| 200a | 2 | 40 |
| 200b | 1 | 80 |
| ... | ... | ... |
| 200n | | |

421, 422, 423

Table 410:

| Provider ID | Network Segment ID | Bandwidth Manager ID | Forward Channel Weight | Return Channel Weight |
|---|---|---|---|---|
| 101 | 200a | 1 | 20 | 80 |
| 102 | 200a | 2 | 30 | 20 |
| 101 | 200b | 1 | 40 | 10 |
| 101 | 200a | 2 | 20 | 5 |
| ... | ... | ... | ... | ... |
| ... | 200n | | | |

411, 412, 413, 414

Table 430:

| Network Segment ID | Forward Channel Frequency | Forward Channel Symbol Rate | Optional Descriptors |
|---|---|---|---|
| 200a | 19,200,020 | 40,000,000 | ... |
| 200b | 19,200,065 | 50,000,000 | ... |
| ... | ... | ... | ... |
| 200n | | | |

LOAD BALANCING

RELATED APPLICATIONS

This application claims priority to U.S. Provisional Patent Application No. 61/540,195, filed on Sep. 28, 2011, and entitled "LOAD BALANCING." Said provisional U.S. application is incorporated herein by reference in its entirety for all purpose.

FIELD OF THE INVENTION

This invention pertains to the fields of satellite communication systems and methods. In particular, this invention pertains to load balancing in satellite networks and to satellite systems thereof.

BACKGROUND

Using satellite communication for providing consumer-based interactive services (e.g. broadband Internet access for home users and small businesses over satellite) has been long ago envisaged. Millions of people, including in developed countries, may not have access to broadband Internet connectivity due to living in small communities and/or far from reach of the terrestrial infrastructure (e.g. cables or DSL). For these people, wireless connectivity, including via satellites, may be the only solution available (currently and in the near future) for obtaining broadband Internet access.

Though the need for consumer-based satellite communication networks was recognized long ago, relatively short supply of available capacity over Ku-band satellites led to realization of only few such networks. With the emergence of Ka-band satellites, capacity is no longer in short supply, thus large consumer-based satellite networks may now be realized.

In a large scale consumer-based satellite network, tens or even hundreds of thousands of users may be connected over a satellite to a single gateway (or hub), which is in turn connected via a high rate link to the Internet backbone (for example, through one or more optic fibers supporting traffic volumes measurable in Gbps (Giga-bits-per-second)). An efficient way to realize such a network may be to leverage on Ka-band very wide transponders (i.e. amplification chains between the receiving and the transmitting antennas of the satellite), each supporting hundreds of MHz of bandwidth (e.g. 200 to 600 MHz in some examples). Aggregating all the traffic transmitted from the gateway towards the user terminals over a single high rate carrier occupying an entire transponder of hundreds of MHz in bandwidth may allow maximizing the total throughput of the network (i.e. as all the transponder's available bandwidth and power may be utilized). With all traffic flowing via a single channel, the network may be also much simpler to manage as it may be always balanced through usage statistics.

However, while Ka-band satellites may include very wide transponders (each spanning hundreds of MHz), baseband equipment (e.g. modulators, demodulators, etc.), which may be used at the gateway and at the user terminals for transmitting and receiving signals via a satellite, may still be compatible with traditional narrow-band transponders. Traditionally, the capacity over Ku-band and C-band satellites is divided to multiple transponders, wherein each transponder supports one of 27, 36, 54 or 72 MHz of bandwidth. Thus, base-band equipment manufactured over the years for operating over such satellites supports transmission and reception of signals that can be fitted into these transponders. For example, many types of modulators and demodulators may support a maximal transmission rate of 30 Msps (Mega-symbols-per-second), which is the maximal transmission rate supportable by a 36 MHz transponder (considering roll-off factor of 0.2). Other types of modulators and demodulators may support transmission rates up to 45 Msps (i.e. fitting into 54 MHz transponders) or up to 60 Msps (i.e. fitting into 72 MHz transponders).

In order to realize a network supporting thousands of Mbps (Mega-bits-per-second), the network may have to be divided into multiple segments, each supporting only tens to few hundreds of Mbps of traffic to part of the user terminals population. With the network being so statically divided, some segments may be overloaded while other segments may be only partly utilized. Thus, a load balancing mechanism is required for at least allowing better usage of the network resources.

BRIEF SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

A satellite communication system comprising a hub and plurality of terminals may be divided into multiple segments, wherein each segment may support part of the terminals through a forward channel and return channels. For each segment, the hub may include the necessary components for transmitting and receiving said channels, as well as providing management and all other services required in a satellite communication system.

In accordance with some aspects of the invention, the satellite communication system may be configured to employ a decentralized load balancing method for at least the purpose of balancing traffic load between its segments. The satellite system may be configured to designate a forward channel of one segment in each coverage beam as a home carrier and to transmit load balancing information over the designated home carriers. The terminals may be further configured to tune on a home carrier, receive the transmitted load balancing information, select a least loaded segment based on the information included in the received table, tune to the forward channel of the selected segment, logon to the selected segment and remain operational in the selected segment until reset, powered off or manually commanded (e.g. by a network operator) to logon to a specified segment.

In other aspects of the invention, an example load balancing table and methods for performing load balancing in accordance with said load balancing table are presented. In some of the presented methods, information included in the table may be used for calculating a relative probability for selecting a segment of the network and resources associated with it through a weighted random selection algorithm, wherein said weighted random selection algorithm may be used for at least the purpose of avoiding imbalance in one or more scenarios where many terminals may perform the said load balancing method simultaneously or within a short interval.

In accordance with additional aspects of the invention, information may be included in the load balancing table for calculating a relative probability for selecting a segment of the network and resources associated with it through a weighted random selection algorithm. Methods are presented for calculating said information, which may be referred to as weights.

In yet further aspects of the invention, methods for coping with unavailability of the home carrier or the load balancing table are presented. Certain methods may use a last known good configuration that may have been saved by the terminal during a previous load balancing instance.

BRIEF DESCRIPTION OF THE DRAWINGS

Having thus described the invention in general terms, reference will now be made to the accompanying drawings, which are not necessarily drawn to scale, and wherein:

DETAILED DESCRIPTION

Figure 1:
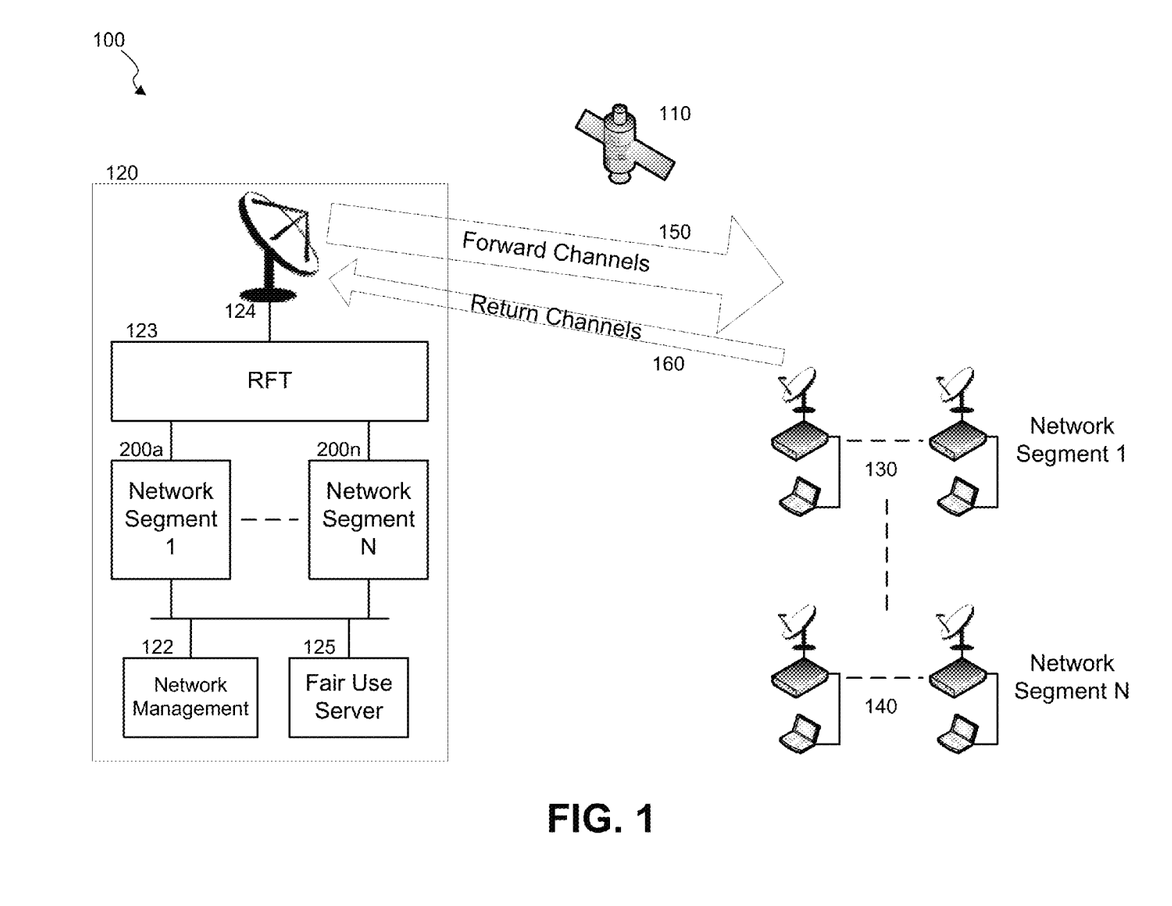
FIG. 1 shows an example of a satellite communication system comprising multiple network segments in accordance with aspects of the invention.
Figure 2:
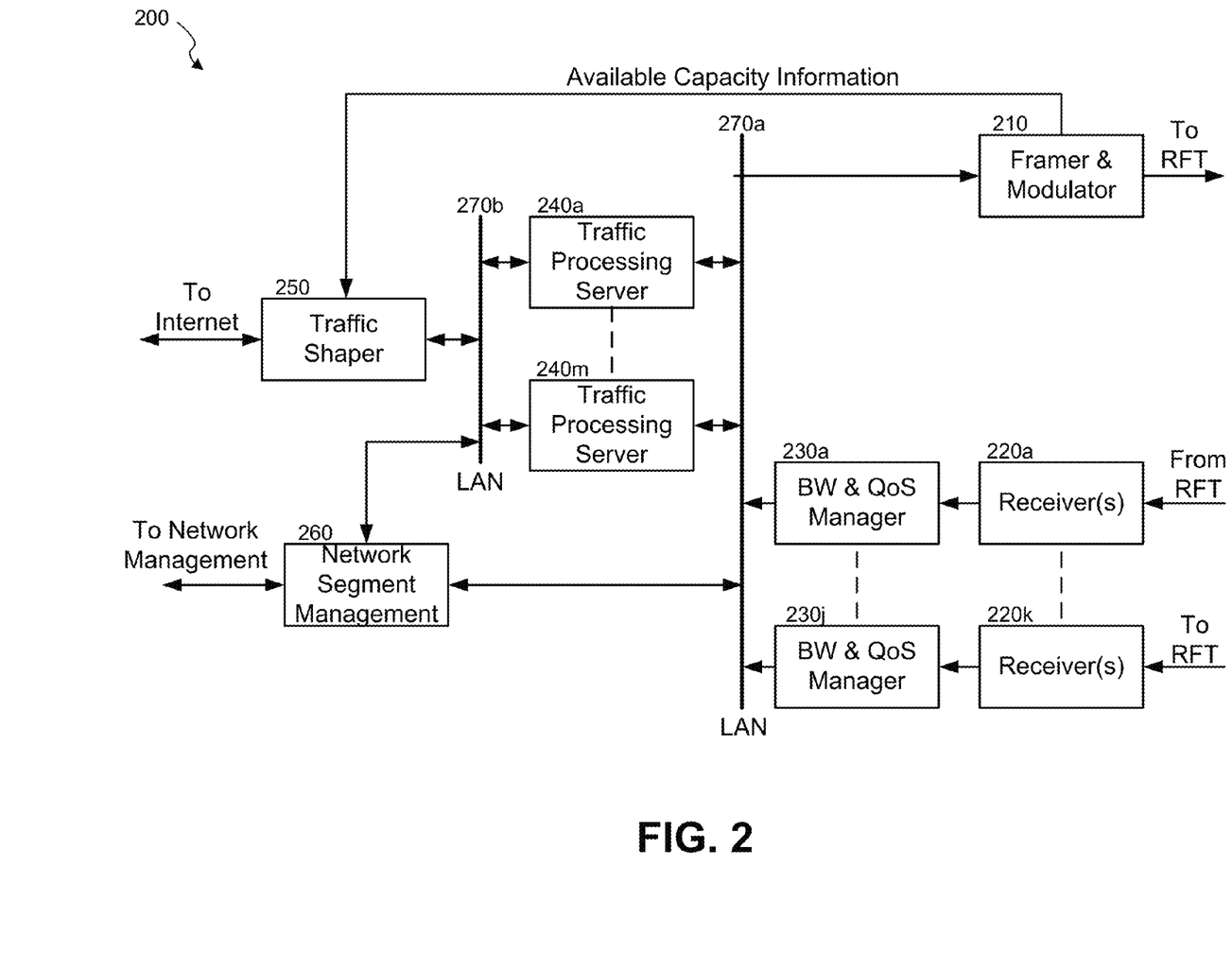
FIG. 2 shows a block diagram of a network segment in accordance with aspects of the invention.

FIG. 1 shows satellite communication system 100 as an example of a satellite communication system comprising multiple network segments. Satellite communication system 100 may comprise a central hub (120) and plurality of terminals (130 and 140). Furthermore, hub 120 may be configured to include a radio frequency transmitter 123, an antenna 124, and multiple network segments (200a to 200n). FIG. 2 shows a block diagram of a network segment 200, which may represent network segments 200a to 200n in FIG. 1. Network segment 200 may be configured to include at least the following components: a modulator (210), configured to transmit a forward channel carrier; one or more receivers (220a to 220k) configured to receive one or more return channel carriers; one or more bandwidth and QoS (Quality of Service) managers (230a to 230j), configured to manage capacity allocation over said return channels; one or more traffic processing servers (240a to 240m), configured, for example, to accelerate traffic over the satellite link (e.g. by means of protocol spoofing, caching, etc.); and a traffic shaper (250), configured, for example, to enforce QoS policies over the forward channel on a per-terminal basis and in some embodiments to limit the total throughput over the forward channel in accordance with available forward channel capacity. In some embodiments, satellite communication system 100 may include one traffic shaper on the network level (i.e. common to all network segments 200a to 200n) instead of a traffic shaper (250) per network segment (this embodiment is not shown in FIG. 1).

In addition, hub 120 of satellite communication system 100 may be further configured to include: a network management system (NMS), further configurable to include a network level management part (FIG. 1, 122) and a management part per network segment (FIG. 2, 260); and a fair use server (125), further configurable to at least calculate a network utilization figure for each network segment 200a to 200n. The hub 120 may include additional elements and/or functions not shown in FIG. 1 and FIG. 2 without departing from the spirit of the invention described herein.

Hub 120 may be configured to transmit data to the terminals (130 and 140) over forward channels (150) and receive data from the terminals over return channels (160), wherein data may be any type of digitally encoded information, including but not limited to files, web-pages, voice and/or video streams, telemetry, network management controls, etc. Each terminal may be configured to be associated with a single network segment at any given time. For example, terminals 130 may receive data from hub 120 over a forward channel associated with network segment 200a, transmit data to the hub 120 over return channels managed by one of the bandwidth and QoS managers associated with network segment 200a, and communicate with a traffic processing server associated with network segment 200a, while terminals 140 may be associated in a similar manner to network segment 200n.

In some aspects of the invention, satellite communication system 100 may be configured to employ a decentralized load balancing method for at least the purpose of balancing the traffic load between network segments 200a to 200n. In some embodiments, said load balancing may further include balancing between bandwidth managers and traffic processing servers within a network segment once a network segment is selected.

Satellite communication system 100 may be configured to have one of its network segments designated as a home carrier. In some embodiments, satellite communication system 100 may be configured to provide service to terminals which may not be serviced over the same one or more segments. For example, satellite communication system 100 may be configured to operate over multiple satellite beams, either via a single satellite or via multiple satellites. In such embodiments, satellite communication system 100 may be configured to have multiple network segments designated as home carriers, wherein one home carrier may be designated per each cluster of network segments configured to operate over the same beam. In yet some additional embodiments, satellite communication system 100 may be configured to have in any one or more of said clusters of network segments, each including more than one network segment, more than one network segment designated as home carrier per cluster, e.g. at least for resilience purposes (i.e. having home carrier functionality as described herein over more than one forward channel).

Figure 3:
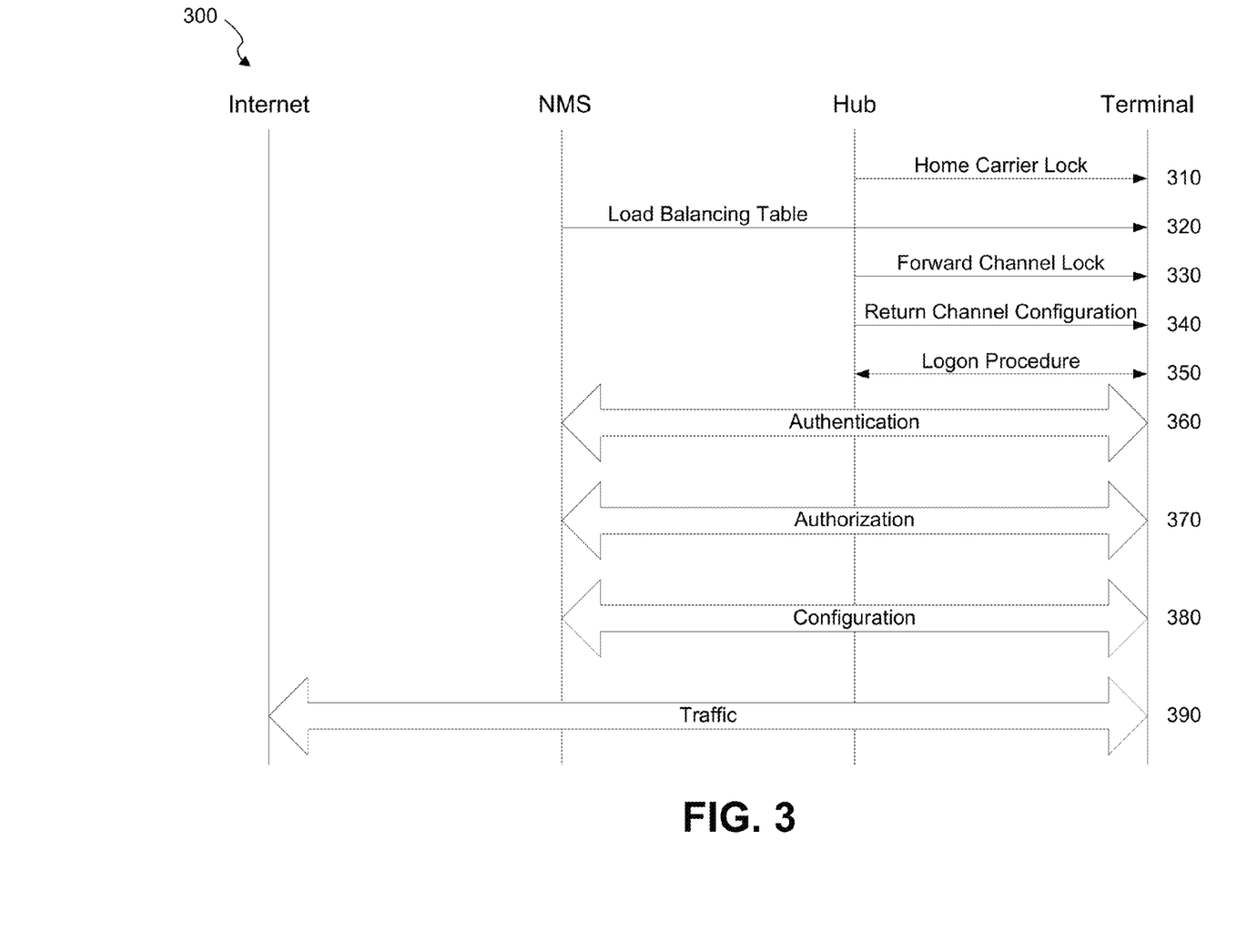
FIG. 3 shows a diagram of a terminal boot sequence in accordance with aspects of the invention.

A terminal (e.g., 130 and/or 140) in satellite communication system 100 may be configured to boot (i.e. go from power off or reset state to full operational state) in accordance to sequence 300, as shown in FIG. 3. Upon start of operation (e.g. power up or reset), said terminal may be configured to receive a forward channel signal transmitted by a network segment designated as home carrier for a cluster of network segments, wherein these network segments may be configured to operate over a satellite beam covering the geographical area in which the terminal may be located. Once the home carrier forward channel is received (310), the terminal may be configured to search data received over the home carrier forward channel in order to extract at least a load balancing table. Said load balancing table may include multiple entries, wherein each entry may include one or more descriptors of one network segment included in the same cluster of network segments to which said home carrier may belong to, as well as information regarding bandwidth managers and traffic processing servers that may be included in said one network segment. Once a load balancing table is received (320), the terminal may be configured to decode the table and to select one of the network segments described in the table. In some embodiments, each entry in said load balancing table may include information regarding the current load on various network segment resources, for example on the forward channel, on the traffic processors, etc. In such embodiments, said terminal may be configured to select a network segment in accordance with a received load balancing table and further in accordance with a combined or weighted load on various network segment resources as per the information included in the received load balancing table. In further embodiments, the terminal may be configured to first select a network segment having low load or lower utilization on its forward channel over a network segment having higher load or higher utilization on its forward channel, and then to select a bandwidth manager and/or a traffic processor having lower load than other bandwidth managers and/or traffic processors associated with the already selected network segment.

Furthermore, in some embodiments, the load balancing table may include descriptors of the forward channel of each network segment listed in the table as described above. These descriptors may include a frequency descriptor, a symbol rate descriptor and any other descriptor that may be required in order to associate a remote terminal with a network segment. The terminal may be configured, upon selecting a network segment and servers associated with the selected networks segment, to stop receiving the home carrier forward channel and to tune its receiver to the forward channel of the selected network segment using said descriptors obtained from the load balancing table. The terminal may be further configured, once the forward channel of the selected network segment is received (330), to search the received data for descriptors of the return channel (for example, in accordance with the DVB-RCS standard (EN 301 790)). Once all the necessary return channel descriptors may be received, the terminal may be configured to initiate a logon procedure (350) by transmitting a logon request towards the hub. The terminal and the management system included in the hub may be configured, once the logon procedure may be successfully concluded, to engage in one or more procedures that may be necessary for putting the terminal into operation, such as an authentication procedure (360), an authorization procedure (370) and a configuration download procedure (380) in which the terminal may receive from the management system (over the now established satellite link) configuration parameters, which may be necessary for its proper operation. Once all necessary procedures are successfully completed the terminal may be connected to its designated network, e.g. the Internet or any other network.

In some embodiments of satellite communication system 100 and of the load balancing method described herein, a terminal may be configured to remain operational in the selected network segment and to use the selected resources associated with the selected network segment until such time that the terminal is reset or powered off. In such embodiments, the terminal may be further configured to maintain the selected network segment (and its associated resources) even throughout a temporary loss of connectivity with the hub. The terminal may be configured to attempt restoring connectivity with the hub using the selected network segment (and its associated resources) for a predefined interval before repeating the load balancing procedure (e.g. by going through a reset cycle). In further embodiments, the terminal may be configured to maintain the selected network segment until either reset, powered off or commanded (e.g. by a network operator) to either repeat the load balancing procedure (FIG. 3) or to assume a specified network segment and associated resources (manual balancing). In yet further embodiments, once the load balancing procedure may be successfully concluded, the terminal may be configured to randomize a first interval within a predefined range and to repeat the load balancing procedure when said first interval expires. However, the terminal may be further configured not to repeat the load balancing procedure when the first interval expires and just randomize a second interval if user traffic may be received or transmitted at the time the first interval expires.

The network management system (122, 260) of satellite communication system 100 may be configured to periodically collect load and/or utilization information from the multiple network segments (200) included in system 100, to generate a load balancing table for each cluster of network segments configured to operate over the same satellite beam, and to periodically transmit the generated load balancing table over the forward channel(s) of the network segment(s) designated as home carrier(s). In some embodiments, the periodicity (e.g., time intervals) for transmitting the load balancing table may be different from the periodicity of generating the load balancing table or updating the information included in the load balancing table. For example, the information included in the load balancing table may be updated every few minutes, while a copy of the load balancing table may be transmitted every several seconds, e.g. in order to allow terminals to quickly acquire the table. In some further embodiments, the network management system may be configured to collect some of the said information from the fair use server (125), which may be configured to at least calculate utilization figures for each network segment.

In yet further embodiments, the network level management part (122) may be configured to collect load and/or utilization information from said multiple network segments, to generate a load balancing table for each cluster of network segments and to send each load balancing table to a network segment management part (260) corresponding with a home carrier over which the table may have to be transmitted. The network segment management part (260) may be configured to receive a load balancing table from the network level management part (122), to preserve the received load balancing table until a new load balancing table is received, and to periodically transmit a copy of the preserved load balancing table over the home carrier. Nevertheless, the network segment management part (260), upon not receiving an updated load balancing table for a predefined update period, may be further configured to either stop transmitting the load balancing table over the home carrier or to mark the preserved copy as invalid (e.g. by setting a predefined field in the table (not shown in FIG. 4)) and continue transmitting it over the home carrier anyway, for at least the purpose of providing the terminals with information on the network topology. These embodiments may be used for at least the purpose of allowing load balancing to continue throughout an outage of the network level management part (122), which may be shorter than the predefined update period.

As the load balancing table may be periodically updated, terminals tuning at different times to a home carrier may receive different copies of the load balancing tables, wherein the copies may differ in at least the load and/or utilization information included in these copies. A first terminal may receive a first copy of the load balancing table, determine a first network segment to be least utilized than other network segments described in said first copy of the load balancing table, and select to become associated with said first network segment (as well as with a first bandwidth manager and a first traffic processing server associated with the first network segment). A second terminal may receive a second copy of the load balancing table, which may differ from the first copy of said load balancing table as described above, determine a second network segment to be least utilized than other network segments described in said second copy of the load balancing table, and select to become associated with said second network segment (as well as with a second bandwidth manager and a second traffic processing server associated with the first network segment), wherein the second network segment and/or the second bandwidth manager and/or the second traffic processing server selected by the second terminal may be different from the first network segment and/or the first bandwidth manager and/or the first traffic processing server selected by the first terminal. Consequently, terminals tuning at different times to said home carrier may be distributed between multiple network segments associated with said home carrier, leading to distribution of the total load in the network between the available resources.

Furthermore, the above described examples and various embodiments may be of a decentralized load balancing method. The terminals may be configured to employ an algorithm for selecting a network segment (and other resources associated with the network segment) based on information broadcasted from the hub, wherein each terminal may so independently select, without knowledge of (similar) selections made by other terminals and without communicating with the hub (e.g. transmitting information to the hub) for the purpose of load balancing. Said decentralization is significantly different from known load balancing art, wherein a centralized balancing function may be configured to receive balancing requests and in response assign or associate each requesting element to or with an appropriate resource (e.g. associate a terminal with a network segment). A decentralized method may successfully balance the load between segments of the network without requiring back and forth communication for that purpose.

In another aspect of the invention, a load balancing table and methods for performing load balancing in accordance with said load balancing table are presented.

Figure 4:
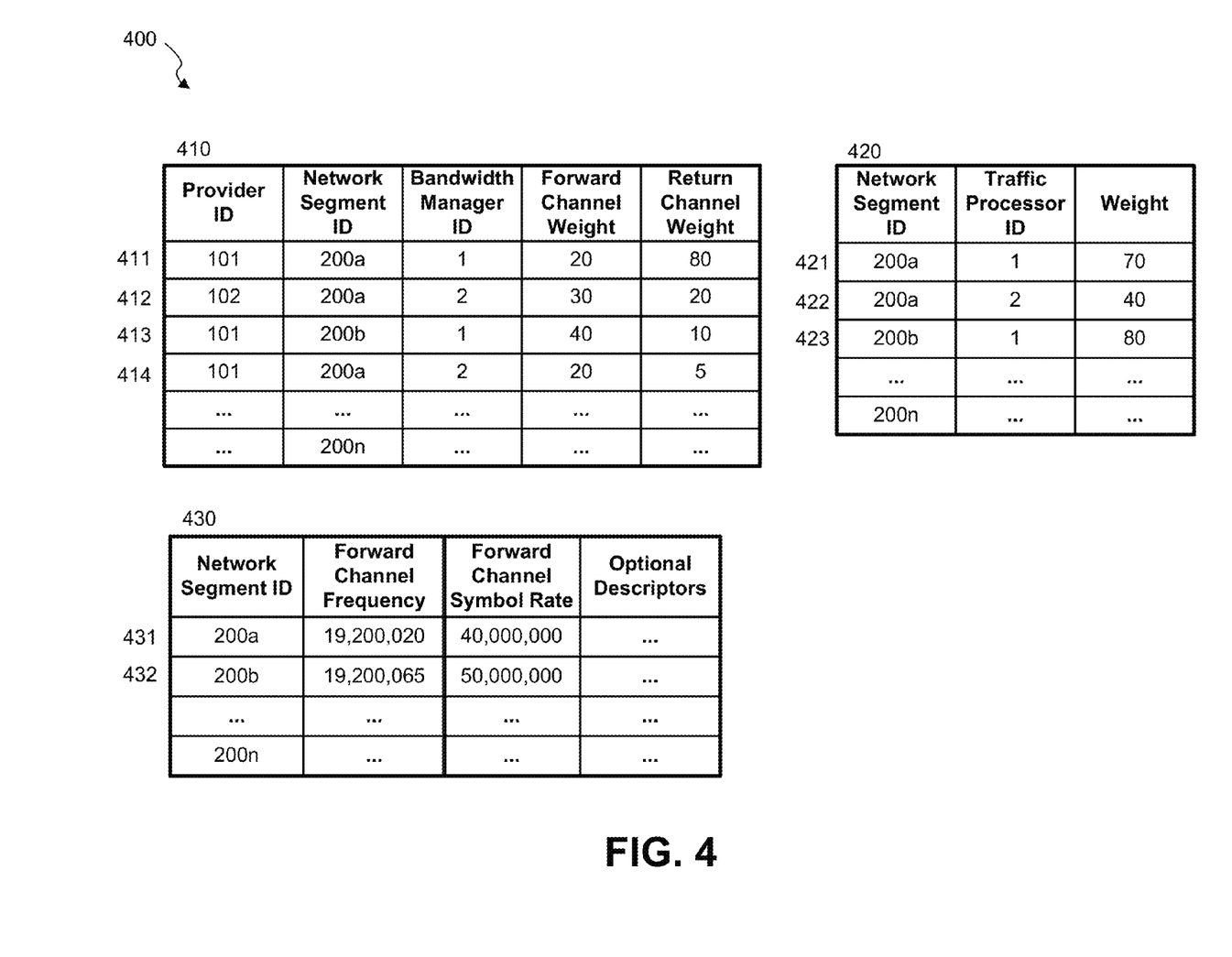
FIG. 4 shows an example of a load balancing table in accordance with aspects of the invention.

FIG. 4 shows an example of a load balancing table 400. In the shown embodiment, load balancing table 400 may comprise three sub-tables: a network segments balancing table 410, a traffic processors balancing table 420, and a network segments information table 430. A terminal (e.g. 130 or 140) configured to receive load balancing table 400 may be further configured to use it in a manner set forth herein.

As satellite communication system 100 may be configured for providing connectivity for a multiple service providers, each terminal (130 and 140) may be associated with at least one of these service providers, for example by being assigned a Provider ID. Thus, the terminal may be configured upon receiving load balancing table 400 to determine valid entries in table 410, wherein an entry may be valid if the Provider ID value of that entry matches a Provider ID value assigned to the terminal. In some embodiments, wherein the satellite communication system may be configured to provide connectivity for a single provider, the Provider ID property may be of no consequence and therefore omitted from table 410. In that case, all entries in table 410 may be determined as valid.

Once valid entries of table 410 were determined, the terminal may be configured to consider a Forward Channel Weight and a Return Channel Weight values in each of the said valid entries for at least the purpose of determining a least utilized network segment. In some embodiments, the weight values may represent load hence the lower the weight values the less utilized the network segment may be. In these embodiments, the terminal may be configured to select a valid entry having the lowest combined weight, or to select a network segment in accordance to a lowest Forward Channel Weight and then a bandwidth manager in accordance with a lowest Return Channel Weight, wherein selection of the bandwidth manager may be limited to valid entries corresponding to the already selected network segment.

In other embodiments, the weight values may represent relative worthiness for selecting the relevant network segment hence the higher the weight values the more worthwhile it may be to select the relevant network segment. In these embodiments, the terminal may be configured to select a valid entry having the highest combined weight, or to select a network segment in accordance to a highest Forward Channel Weight and then a bandwidth manager in accordance with a highest Return Channel Weight, wherein selection of the bandwidth manager may be limited to valid entries corresponding to the already selected network segment.

In yet further embodiments, the terminal may be configured to randomly select one of the valid network segments, wherein probabilities for selecting a specific network segment may be determined in accordance with the weight values. For example and in reference to FIG. 4, a terminal may be associated with Provider ID 101 hence entries 411, 413 and 414 may be valid entries for this terminal. The terminal may be configured to select one of entries 411, 413 or 414 by a random selection. In some of these embodiments, the terminal may be configured to combine both the Forward Channel Weight and the Return Channel Weight to determine the probability for selecting an entry. In such embodiments, the probability of selecting entry 411 may be twice as higher as the probability of selecting entry 413 and four times higher than the probability of selecting entry 414, as the combined weight of entry 411 (20+80=100) may be twice the combined weight of entry 413 (40+10=50) and four times the combined weight of entry 414 (20+5=25). In such embodiments, selection of an entry may include both the selection of a network segment and a selection of a bandwidth manager within the network segment, wherein the selected bandwidth manager may be the one indicated in the selected entry. In other embodiments, the selection process may be divided in to two steps, wherein the network segment may be selected in accordance with probabilities based on Forward Channel Weight values and the bandwidth manager may be selected in accordance with a probabilities based on the Return Channel Weight values while considering only valid entries corresponding to the already selected network segment. For example, wherein entries 411, 413 and 414 may be valid entries for the terminal, the probability of selecting entry 413 may be twice the probability of selecting any of entries 411 or 414, as the Forward Channel Weight of entry 413 (40) may be twice the Forward Channel Weight of entries 411 and 414 (20). For example and without any limitation, considering that the selected entry is one of 411 or 414 (i.e. the selected network segment may be 200a), a bandwidth manager may be then selected in accordance with the Return Channel Weight values of entries 411 and 414, wherein in this example the probability of selecting bandwidth manager 1 may be 16 times higher than selecting bandwidth manager 2 since the Return Channel Weight of entry 411 (80) is 16 times higher than the Return Channel Weight of entry 414 (5). In other examples, an algorithm may be used wherein determining said probabilities may be in accordance with a descending weight magnitude instead of an ascending weight magnitude, such an algorithm being similar to the algorithm already described above.

Again in reference to FIG. 4, once a network segment and a bandwidth manager may have been selected in accordance with table 410 as previously described, the terminal may be configured to select a traffic processing server (traffic processor) in accordance with table 420 and the already selected network segment. As per the previous examples, considering without limitation that network segment 200a was selected, the terminal may be configured to select any of entries 421 or 422 in accordance to the Weight figures in these entries. As previously described, weight can either represent load (for example in accordance with processing power utilization, memory utilization, packets per second being processed or any other criteria) wherein a lower weight figure may represent a better choice, or represent worthiness wherein a higher weight figure may represent a better choice. In either case, the terminal may be configured to use a proper selection algorithm in accordance with the representation used, whether the selection is based directly on the weight figures or on randomization as previously described.

Finally, the terminal may be configured to search table 430 and to select an entry corresponding the already selected network segment. In some embodiments, wherein table 430 may include optional descriptors related to the bandwidth manager and/or to the traffic processor, an entry may be selected from table 430 only if it corresponds to the already selected network segment, bandwidth manager and/or traffic processor. Once an entry has been selected, the terminal may be configured to use the information included in the selected entry for tuning on the forward channel of the selected network segment (FIG. 3, step 330) and to continue its boot sequence as shown in FIG. 3.

Figure 5:
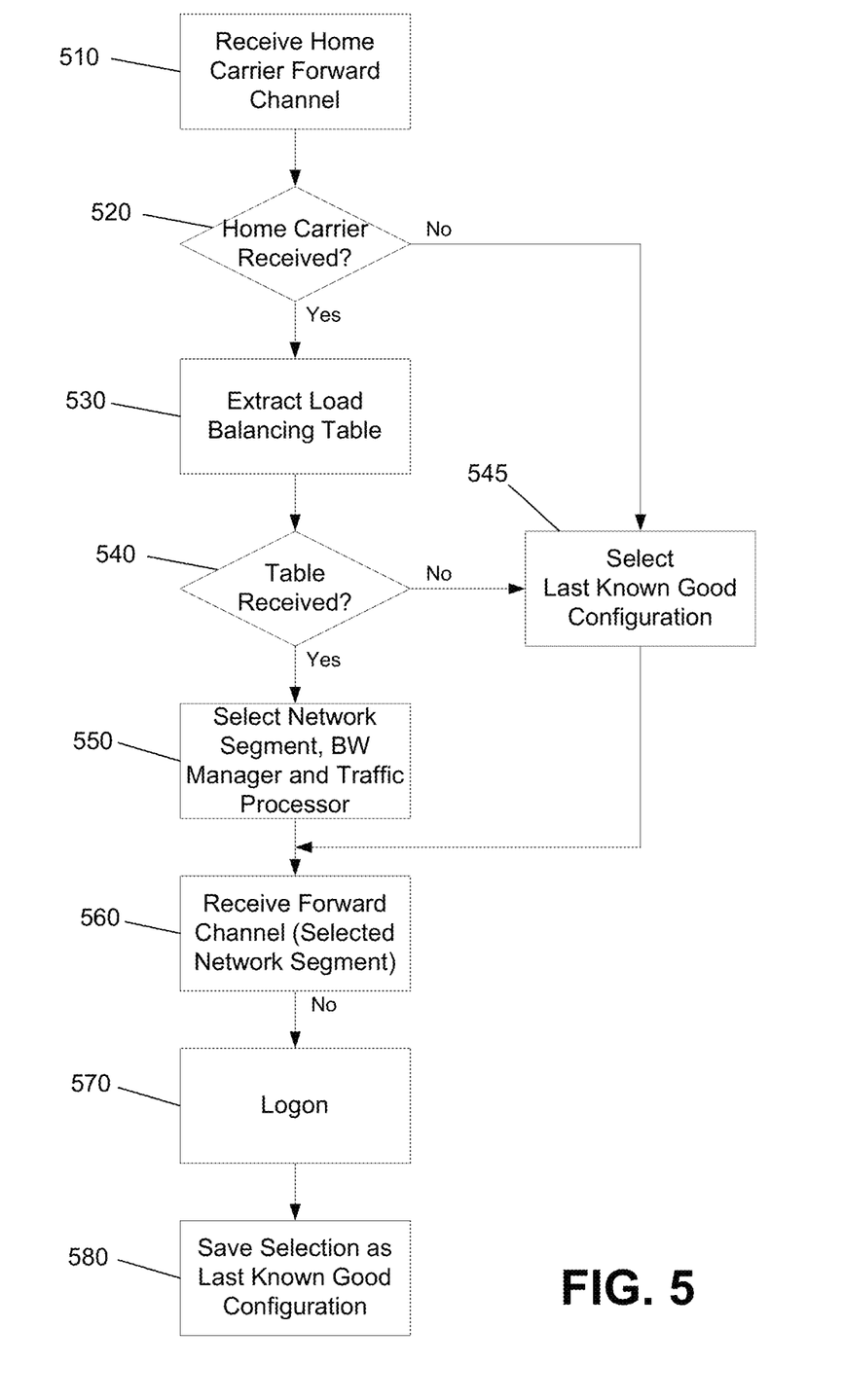
FIG. 5 shows a flow chart of a load balancing algorithm in accordance with aspects of the invention.

As shown in FIG. 3 and described above, the existence of a functioning home carrier may be essential for completing a terminal boot sequence. However, since everything is likely to malfunction at some point in time, a terminal may try to boot while the home carrier may not be available or it may not carry the load balancing table. FIG. 5 further illustrates additional aspects of the load balancing methods described above, which may support a successful terminal boot in the absence of a home carrier or the load balancing table.

As previously described, the terminal may be configured to receive a home carrier forward channel (510). If the home carrier is received (520), the terminal may be further configured to search data received over the home carrier channel and extract a load balancing table (530). If a load balancing is successfully received (540), the terminal may be configured to select a network segment, a bandwidth manager and a traffic processor in accordance with information included in the received load balancing table, for example as previously described in reference to FIG. 4. However, if for some reason the terminal fails to receive the home carrier forward channel (520) or fails to extract a (valid) load balancing table from data received over the home carrier forward channel (540), the terminal may be configured to select a last known good configuration (545), wherein a last known good configuration may comprise of associations to a network segment, a bandwidth manager and a traffic processor, which the terminal may have successfully selected the previous instance of performing the load balancing algorithm and which may have been preserved into the terminal's non-volatile memory at that time (580). Either way, once the terminal has selected a network segment, a bandwidth manager and a traffic processor, i.e. be it in accordance with a received load balancing table or in accordance with a previously saved last known good configuration, the terminal may be configured to tune on and receive the forward channel of the selected network segment (560) and to logon to the selected network segment (570). Once successfully logged on to the network segment (e.g. to bandwidth manager 230, to traffic processing server 240 and to network segment management 260, as shown in FIG. 2), the terminal may be configured to save the selected network segment, bandwidth manager and traffic processor associations as a last known good configuration (580) for a next instance of performing the above described load balancing method.

As previously described, the network management system (122, 260) of satellite communication system 100 may be configured to periodically collect load and/or utilization information from multiple network segments (200) included in system 100, to generate a load balancing table 400 (FIG. 4) for a cluster of network segments (e.g. configured to operate over the same satellite beam), and to periodically transmit load balancing table 400 over a forward channel of at least one network segment included in said cluster and designated as home carrier for the cluster. A terminal (e.g. 130 or 140) associated with said cluster may be configured to receive at least one instance of load balancing table 400 and possibly locate a network segments balancing sub-table 410 included in load balancing table 400, determine one or more valid entries in sub-table 410 (e.g. based on a Provider ID, as previously described), and to consider at least a Forward Channel Weight value in each of the valid entries for at least the purpose of selecting a network segment. Once a network segment is selected, the terminal may be further configured to consider at least a Return Channel Weight value in each of the valid entries corresponding to the already selected network segment for at least the purpose of selecting a bandwidth manager associated with the already selected network segment. In some embodiments, a weight value included in the network segments balancing sub-table 410 may represent relative worthiness for selecting the corresponding network resource (e.g. a network segment, a bandwidth manager), and the terminal may be configured to randomly select network resources in accordance with valid entries, wherein probabilities for the random selections of specific network resources may be determined in accordance with corresponding weight values in the network segments balancing sub-table 410 or other storage location.

In accordance with additional aspects of the invention, methods are presented for calculating said weight values.

As previously described, satellite communication system 100 may be configured to provide connectivity for multiple service providers and each terminal (130 and 140) may be associated with at least one of these service providers. For example, each terminal 130, 140 may be assigned a Provider ID associated with a corresponding provider. In some embodiments, satellite communication system 100 may be further configured to allow management of forward channel capacity and/or return channel capacity on a per provider basis. For example, a provider may be allocated a capacity over one or more (e.g. N) network segments included in a cluster. The capacity that may be allocated for said provider on each (e.g. $1 \leq i \leq N$) of the one or more said network segments (e.g. CAP(i)) may be in accordance with a target number of terminals (e.g. TGT(i) that may be expected to use said capacity and an expected usage (e.g. average bit rate) per terminal (e.g. BR(i)). Thus, per each of the one or more network segments on which the provider may be allocated capacity, the target number of terminals (TGT(i)) may be directly proportional to the allocated capacity (CAP(i)) and reversely proportionate to the expected usage per terminal (BR(i)), i.e.:

$$TGT(i) \sim \frac{CAP(i)}{BR(i)}$$

Furthermore, network management system (122, 260) of satellite communication system 100 may be configured to periodically and/or occasionally collect load and/or utilization information for one or more network segments included in said cluster. In some embodiments, said collected information may include, for each of said one or more network segments, and on a per provider basis, at least a number of terminals logged on (e.g. TER(i)) and a utilization figure (e.g. UF(i)) that may reflect the load on the allocated capacity. In some embodiments, said utilization figure may represent a ratio between an amount of traffic pending to be transmitted and an available capacity (e.g. CAP(i)), thus a higher utilization figure may reflect a higher load. In some embodiments, said collected utilization figures may be long term utilization figures, wherein long term utilization figures may be produced from short term utilization figures, for example, by averaging short term utilization figures over a first interval and selecting the highest average value over a second interval. For example, said first interval may be between few tens of minutes and several hours, while said second interval may be between several hours and several days.

Given the above defined information items, that may be periodically and/or occasionally collected within satellite communication 100, the following may be defined:

A value p(i) (0≤p(i)≤1) may be defined as a probability for selecting network segment i based only on a number of logged on terminals (TER(i)) in reference to a target number of terminals (TGT(i)).

A value q(i) (0≤q(i)≤1) may be defined as a probability for selecting network segment i based only on said utilization factor (UF(i)).

A value α (0≤α≤1) may be defined as a parameter for at least the purpose of balancing between the above defined probabilities.

A value β (β≥0) may be defined as a parameter for at least the purpose of determining and accentuation of the utilization factor.

Given the above definitions, the probability value p(i) may be calculated as follows, wherein j runs over all applicable network segments (1≤j≤N) and MAX is the mathematical maximum value function:

$$p(i) = \begin{cases} \dfrac{\text{MAX}(0, (TGT(i) - TER(i)))}{\sum_j \text{MAX}(0, (TGT(j) - TER(j)))} & \sum_j \text{MAX}(0, (TGT(j) - TER(j))) \neq 0 \\ \dfrac{1}{N} & \sum_j \text{MAX}(0, (TGT(j) - TER(j))) = 0 \end{cases}$$

It may be noted that the probability value p(i) may be calculated in accordance to the relative population of terminals over the applicable network segments (e.g. network segments in which the applicable provider is allocated capacity) within said cluster as long as there may be at least one network segment (for example network segment k) on which the number of currently logged on terminals may have not reached the target number of terminals (i.e. TER(k)<TGT(k)). Once all applicable network segments are fully populated (i.e. TER(i)≥TGT(i) for each 1≤i≤N), p(i) may reflect the same probability for all applicable relevant network segments, and thus may allow an even distribution of additional terminals (e.g. beyond said target numbers) between the applicable network segments.

The probability value q(i) may be calculated as follows, wherein j runs over all applicable network segments (1≤j≤N):

$$q(i) = \frac{\left(\frac{1}{UF(i)}\right)^\beta}{\sum_j \left(\left(\frac{1}{UF(j)}\right)^\beta\right)}$$

For example, if β=1, a utilization factor twice as high may yield a probability 2 times lower. In another example, if β=2, a utilization factor twice as high may yield a probability 4 times lower.

Furthermore, having separately calculated said probability values $p_i$ and $q_i$ as described above, a combined probability (e.g. w(i)) for selecting a network segment may be calculated as follows:

$$w(i) = \alpha^* p(i) + (1-\alpha)^* q(i)$$

It may be relatively easy to show that $\Sigma_j w(i)=1$ wherein j runs over all applicable network segments (1≤j≤N).

Given a combined probability (w(i)) for selecting a network segment, a weight figure, (e.g., W(i)), as it may be included in load balancing table 400, may be calculated as follows, wherein C may be a predefined constant, which may be used at least for the purpose of allowing use of integer notation (i.e. instead of floating point notation) while providing sufficient resolution:

$$W(i) = C^* w(i)$$

In some embodiments, wherein a single bandwidth manager (230) may be used per network segment (200), the above described calculation may be used for calculating the Forward Channel Weights (sub-table 410), while Return Channel Weights may all be set to a constant value, as they might have no consequence (i.e. once a network segment is selected, there may be only one bandwidth manager available for selection with a 100% probability).

In some embodiments, a network segment (i) may include more than one bandwidth manager (230). In such embodiments, a return channel capacity allocated to a provider over a network segment may be further divided between one or more of the bandwidth managers (230) included in said network segment (e.g., (M(i) may represent the number of bandwidth managers (230) in network segment i (1≤i≤N) in which the provider is allocated return channel capacity). In such embodiments, the network management system (122, 260) of satellite communication system 100 may be configured to collect information regarding load and/or utilization, on a per provider basis, and separately for forward channels and for return channels, for at least the purpose of calculating Return Channel Weights as well as Forward Channel Weights. Different values corresponding to the forward channels and to the return channels may be defined and/or collected, including the target number of terminals (e.g. $TGT_F(i)$ and $TGT_R(i,k)$ respectively, wherein 1≤k≤M(i)), the number of logged on terminals (e.g. $TER_F(i)$ and $TER_R(i,k)$ respectively, wherein 1≤k≤M(i)), and the utilization factor (e.g. $UF_F(i)$ and $UF_R(i,k)$, wherein 1≤k≤M(i)). Once the information is collected, calculation of Forward Channel Weights may be as previously described, while calculation of Return Channel Weights may be limited to the scope of a single network segment, as shown below:

For example, a probability value $p_F(i)$ (0≤$p_F(i)$≤1), representing the probability of selecting (the forward channel of) network segment i based only on a number of logged on terminals (TER(i)) in reference to a target number of terminals (TGT(i)), may be calculated as follows, wherein j runs over all applicable network segments (1≤j≤N):

$$p_F(i) = \begin{cases} \dfrac{\text{MAX}(0, (TGT_F(i) - TER_F(i)))}{\sum_j \text{MAX}(0, (TGT_F(j) - TER_F(j)))} & \sum_j \text{MAX}\left(0, \left(\dfrac{TGT_F(j)-}{TER_F(j)}\right)\right) \neq 0 \\ \dfrac{1}{N} & \sum_j \text{MAX}\left(0, \left(\dfrac{TGT_F(j)-}{TER_F(j)}\right)\right) = 0 \end{cases}$$

A probability value $q_F(i)$ ($0 \leq q_F(i) \leq 1$), representing the probability of selecting (the forward channel of) network segment i based only on the utilization factor for the forward channel ($UF_F(i)$), may be calculated as follows, wherein j runs over all applicable network segments ($1 \leq j \leq N$):

$$q_F(i) = \frac{\left(\dfrac{1}{UF_F(i)}\right)^\beta}{\sum_j \left(\left(\dfrac{1}{UF_F(j)}\right)^\beta\right)}$$

Having separately calculated said probability values $p_F(i)$ and $q_F(i)$ as described above, a combined probability $w_F(i)$ for selecting (the forward channel of) a network segment may be calculated as follows:

$$w_F(i) = \alpha^* p_F(i) + (1-\alpha)^* q_F(i)$$

Given a combined probability ($w_F(i)$) for selecting (the forward channel of) a network segment, a weight figure, $W_F(i)$, as it may be included in load balancing table 400, may be calculated as follows, wherein C may be a predefined constant:

$$W_F(i) = C^* w_F(i)$$

Additionally, a probability value $p_R(i,k)$ ($0 \leq p_R(i,k) \leq 1$), representing the probability of selecting a bandwidth manager k in network segment i based on a number of logged on terminals ($TER(i,k)$) in reference to a target number of terminals ($TGT(i,k)$), may be calculated as follows, wherein k runs over all applicable bandwidth managers within network segment i ($1 \leq k \leq M(i)$):

$$p_R(i,k) = \begin{cases} \dfrac{\text{MAX}\left(0, \left(\dfrac{TGT_R(i,k)-}{TER_R(i,k)}\right)\right)}{\sum_j \text{MAX}\left(0, \left(\dfrac{TGT_R(i,k)-}{TER_R(i,k)}\right)\right)} & \sum_j \text{MAX}\left(0, \left(\dfrac{TGT_R(i,j)-}{TER_R(i,j)}\right)\right) \neq 0 \\ \dfrac{1}{M} & \sum_j \text{MAX}\left(0, \left(\dfrac{TGT_R(i,j)-}{TER_R(i,j)}\right)\right) = 0 \end{cases}$$

A probability value $q_R(i,k)$ ($0 \leq q_R(i,k) \leq 1$), representing the probability of selecting a bandwidth manager k in network segment i based only on the utilization factor for the return channels managed by bandwidth manager k ($UF_R(i,k)$), may be calculated as follows, wherein k runs over all applicable bandwidth managers within network segment i ($1 \leq k \leq M(i)$):

$$q_R(i,k) = \frac{\left(\dfrac{1}{UF_R(i,k)}\right)^\beta}{\sum_j \left(\left(\dfrac{1}{UF_R(i,j)}\right)^\beta\right)}$$

Having separately calculated said probability values $p_R(i,k)$ and $q_R(i,k)$ as described above, a combined probability $w_R(i,k)$ for selecting a bandwidth manager k in network segment i may be calculated as follows:

$$w_R(i,k) = \alpha^* p_R(i,k) + (1-\alpha)^* q_R(i,k)$$

Given a combined probability ($w_R(i,k)$) for selecting a bandwidth manager k in network segment i, a weight figure, $W_R(i,k)$, as it may be included in load balancing table 400, may be calculated as follows, wherein C may be a predefined constant:

$$W_R(i,k) = C^* w_R(i,k)$$

As will be appreciated by one of skill in the art upon reading the following disclosure, various aspects described herein may be embodied as methods, systems, apparatus (e.g., components of a satellite communication network), and/or computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the true spirit and scope of the present invention. The description is thus to be regarded as illustrative instead of restrictive on the present invention.

The invention claimed is:

1. A method, comprising:
   receiving at a terminal of a satellite communication system a load balancing table transmitted over a home carrier;
   selecting one of a plurality of system segments in accordance with load information included in said received load balancing table, wherein the selecting is performed independently and without knowledge of segment selections made by other terminals in the satellite communication system, and without transmitting a load balancing request to a hub of said satellite communication system;
   selecting a bandwidth manager from one or more bandwidth managers included in the selected system segment;

extracting from the load balancing table one or more descriptors corresponding to a forward channel corresponding to the selected system segment;

tuning to the forward channel of the selected segment using the extracted descriptors;

sending from the terminal a logon request to the hub; and selecting a traffic processing server from one or more traffic processing servers included in the selected system segment.

2. The method of claim 1, further including operating in the selected segment until the terminal is either reset, or powered off, or manually commanded to select a different specified segment.

3. The method of claim 1, wherein the load balancing table comprises a segments balancing sub-table, a traffic processors balancing sub-table and a segments information sub-table, and wherein said selecting, extracting, and tuning further comprise:

selecting a segment and a bandwidth manager in accordance with the segments balancing sub-table;

selecting a traffic processing server in accordance with the traffic processors balancing sub-table and in accordance with the already selected segment;

determining an entry in the segments information sub-table corresponding to the selected segment, bandwidth manager and traffic processor; and using the information included in the entry selected from the segments information sub-table for tuning on the forward channel of the selected segment and for operating in the selected segment.

4. The method of claim 3, wherein the terminal is associated with a provider identifier and wherein said selecting further includes:

comparing the terminal's provider identifier with a provider identifier included in an entry of the segments balancing sub-table;

determining that said entry is valid if the terminal's provider identifier is the same as the provider identifier included in said entry; and disregarding all entries in said segments balancing sub-table which are invalid.

5. The method of claim 3, wherein said selecting further includes considering a forward channel weight value and a return channel weight value included in one or more entries of the segments balancing sub-table.

6. The method of claim 5, wherein said weight values included in an entry of the segments balancing sub-table represent relative probabilities for selecting the segment and the bandwidth manager corresponding to said entry, and wherein said selecting further includes:

determining a relative probability for selecting a segment and a bandwidth manager by combining a forward channel weight value and a return channel weight value included in a valid entry of said segments balancing sub-table; and selecting a segment and a bandwidth manager by randomly selecting one of said valid entries in accordance with said determined relative probabilities for selecting a segment and a bandwidth manager.

7. The method of claim 5, wherein said weight values included in an entry of the segments balancing sub-table represent relative probabilities for selecting the segment and the bandwidth manager corresponding to said entry, and wherein said selecting further includes:

determining a relative probability for selecting a segment in accordance with a forward channel weight value included in a valid entry of said segments balancing sub-table;

selecting a segment by randomly selecting one of said valid entries in accordance with said determined relative probabilities for selecting a segment;

determining a relative probability for selecting a bandwidth manager in accordance with a return channel weight value included in a valid entry of said segments balancing sub-table corresponding to the already selected segment; and selecting a bandwidth manager by randomly selecting one of said valid entries corresponding to the already selected segment in accordance with said determined relative probabilities for selecting a bandwidth manager.

8. The method of claim 1, further comprising:

determining that the home carrier cannot be received or that a valid load balancing table cannot be extracted from the received home carrier;

selecting a last known good configuration, wherein the last known good configuration comprises associations to a segment, a bandwidth manager, and a traffic processor previously selected by the terminal;

using the information included in the last known good configuration for tuning on a forward channel and for operating in the corresponding segment; and preserving a last known good configuration after logging on to the corresponding segment.

9. The method of claim 1, further comprising:

randomizing a first interval within a predefined range;

determining that no user traffic is either received or transmitted at the time said first interval expires;

tuning on the home carrier;

receiving a load balancing table transmitted over the home carrier;

selecting one of the system segments in accordance with load information included in said received load balancing table, wherein selecting is performed independently and without knowledge of segment selections made by other terminals and without transmitting any information or request to the hub;

selecting a bandwidth manager from one or more bandwidth managers included in the selected system segment;

extracting from the load balancing table one or more descriptors corresponding to a forward channel corresponding to the selected system segment;

tuning to the forward channel of the selected segment; and sending a logon request to the hub.

10. A method, comprising:

designating at a hub of a satellite communication system, the system configured to include multiple segments each including a forward channel and one or more return channels, at least one forward channel of one segment as home carrier;

collecting load or utilization information from the multiple segments included in said system in accordance with a first periodicity;

generating a load balancing table or updating a load balancing table in accordance with said first periodicity, wherein the load balancing table comprises a segments balancing sub-table and a segments information sub-table, the segments balancing sub-table comprising one or more entries corresponding to the multiple segments of the system and wherein each of the one or more entries comprises at least a forward channel weight value corresponding to the collected load or utilization information associated with a forward channel of a respective system segment; and transmitting the load balancing table over the designated home carrier in accordance with a second periodicity, wherein the second periodicity represents higher frequency than the first periodicity.

11. The method of claim 10, wherein said system is configured to include two or more clusters of segments, each containing one or more segments, and wherein said designating and transmitting further comprise:

designating at least one forward channel of one segment from each cluster of segments as a home carrier; and transmitting a different load balancing table over each home carrier, wherein each load balancing table includes entries corresponding to one or more segments included in the same cluster that the home carrier corresponds to.

12. The method of claim 10, wherein each segment of the system includes at least a modulator configured to transmit a forward channel carrier and one or more bandwidth managers configured to manage capacity allocation over one or more return channels, and wherein the segments information sub-table includes one or more descriptors corresponding to the forward channel and the bandwidth managers included in each segment.

13. The method of claim 12, wherein one or more descriptors corresponding to a forward channel include at least a frequency descriptor and a symbol rate descriptor.

14. The method of claim 10, wherein each of the one or more entries included in the segments balancing sub-table comprises at least a forward channel weight value and a return channel weight value corresponding to a respective system segment.

15. The method of claim 14, wherein said weight values included in an entry of the segments balancing sub-table represent relative probabilities for selecting the segment and the bandwidth manager corresponding to said entry.

16. The method of claim 15, wherein said system is configured to provide connectivity for one or more providers over one or more network segments (N) in a first cluster of network segments, the method further comprising:

determining, per network segment (i), a target number of terminals (TGT(i)) associated with a first provider;

determining, per network segment (i), a number of logged on terminals (TER(i)) associated with the first provider;

determining, per network segment (i), a utilization figure (UF(i)) in accordance with a capacity allocated to the first provider;

calculating, per network segment (i), a first probability value (p(i)) for selecting the network segment only in accordance with said number of logged on terminals (TER(i)) in reference to said target number of terminals (TGT(i));

calculating, per network segment (i), a second probability value (q(i)) for selecting the network segment only in accordance with said utilization factor (UF(i));

calculating, per network segment (i), a combined probability value (w(i)) for selecting the network segment in accordance with said first and second probability values; and calculating, per network segment (i), a forward channel weight value (W(i)) for the network segment.

17. The method of claim 16, wherein said utilization figure (UF(i)) is a long term utilization figure produced by averaging short term utilization figures over a first interval and selecting the highest average value over a second interval.

18. The method of claim 16, wherein calculating per network segment (i) said first probability value (p(i)) further includes:

determining that the number of logged on terminals in at least one network segment (k) of said one or more network segments has not reached the target number of terminals of the at least one network segment; and calculating said first probability value per network segment (p(i)) as directly proportional to a difference between the target number of terminals associated with the network segment (TGT(i)) and the number of terminals logged on to the network segment (TER(i)), and reversely proportional to the sum of such differences over all said one or more network segments.

19. The method of claim 18, further including:

calculating said first probability value per network segment (p(i)) to be 1/N for each of said one or more network segments upon determining that the number of logged on terminals in each of the said one or more network segments has reached or exceeded the target number of terminals for the network segment.

20. The method of claim 16, wherein calculating per network segment (i) said second probability value (q(i)) as directly proportional to the reversed value of the utilization factor (1/UF(i)) and reversely proportional to the sum of such reversed values over all said one or more network segments, and in accordance with a predefined parameter.

21. The method of claim 16, wherein calculating per network segment (i) said combined probability value (w(i)) in accordance with said first and second probability values (p(i) and q(i) respectively) is in accordance with a predefined weighting factor $\alpha(0 \leq \alpha \leq 1)$.

22. The method of claim 16, wherein calculating a forward channel weight value (W(i)) for network segment (i) is in accordance with a predefined parameter.

23. The method of claim 16, wherein each of said one or more network segments includes one bandwidth manager configured to manage capacity allocation over one or more return channels, and wherein the method further includes a step of a setting a return channel weight associated with said one bandwidth manager to a predefined value.

24. The method of claim 16, wherein at least one of said one or more network segments includes more than one bandwidth managers (M(i)) configured to manage capacity allocation over one or more return channels, and wherein said system is configured to provide connectivity for one or more providers using said more than one bandwidth managers included in said at least one network segments, the method further comprising:

determining, per network segment (i) and a bandwidth manager (k) included in the network segment (i), a target number of terminals ($TGT_R(i,k)$) associated with a first provider;

determining, per network segment (i) and a bandwidth manager (k) included in the network segment (i), a number of logged on terminals ($TER_R(i,k)$) associated with the first provider;

determining, per network segment (i) and a bandwidth manager (k) included in the network segment (i), a utilization figure ($UF_R(i,k)$) in accordance with a capacity allocated to the first provider per network segment (i) and the bandwidth manager (k);

calculating, per network segment (i) and bandwidth manager (k), a first probability value ($p_R(i,k)$) for selecting the bandwidth manager after the network segment (i) has been chosen only in accordance with said number of logged on terminals ($TER_R(i,k)$) in reference to said target number of terminals ($TGT_R(i,k)$);

calculating, per network segment (i) and bandwidth manager (k), a second probability value ($q_R(i,k)$) for selecting the bandwidth manager after the network (i) has been chosen only in accordance with said utilization factor ($UF_R(i,k)$);

calculating, per network segment (i) and bandwidth manager (k), a combined probability value ($w_R(i,k)$) for selecting the bandwidth manger after the network (i) has been chosen in accordance with said first and second probability values; and calculating, per network segment (i) and bandwidth manager (k), a return channel weight value ($W_R(i,k)$) for the network segment and the bandwidth manager.

25. The method of claim 24, wherein said utilization figure ($UF_R(i,k)$) is a long term utilization figure produced by averaging short term utilization figures over a first interval and selecting the highest average value over a second interval.

26. The method of claim 24, wherein calculating per network segment (i) and bandwidth manager (k) said first probability value ($p_R(i,k)$) further includes:

determining that the number of logged on terminals in at least one bandwidth manager included in network segment (i) has not reached the target number of terminals of the at least one bandwidth manager; and calculating said first probability value per network segment (i) and bandwidth manager (k) ($p_R(i,k)$) as directly proportional to a difference between the target number of terminals associated with the bandwidth manager ($TGT_R(i,k)$) and the number of terminals logged on to the bandwidth manager ($TER_R(i,k)$), and reversely proportional to the sum of such differences over all said bandwidth managers in the network segment (i).

27. The method of claim 26, further including:

calculating said first probability value per network segment (i) and bandwidth manager (k) ($p_R(i,k)$) to be $1/(M(i))$ for each of said more than one bandwidth managers included in network segment (i) upon determining that the number of logged on terminals in each of the said more than one bandwidth managers included in network segment (i) has reached or exceeded the target number of terminals for the bandwidth manager.

28. The method of claim 24, further calculating per network segment (i) and bandwidth manager (k) said second probability value ($q_R(i,k)$) as directly proportional to the reversed value of the utilization factor ($1/UF_R(i,k)$) and reversely proportional to the sum of such reversed values over all said bandwidth managers in the network segment (i), and in accordance with a predefined parameter.

29. The method of claim 24, wherein calculating per network segment (i) and bandwidth manager (k) said combined probability value ($w_R(i,k)$) in accordance with said first and second probability values ($p_R(i,k)$ and $q_R(i,k)$ respectively) is in accordance with a predefined weighting factor $\alpha(0 \le \alpha \le 1)$.

30. The method of claim 24, wherein calculating a return channel weight value ($W(i,k)$) for a bandwidth manager (k) included in a network segment (i) is in accordance with a predefined parameter.

31. A method of load balancing between segments in a satellite communication system comprising a hub and a plurality of terminals, the system including multiple segments each supporting a subset of the plurality of terminals through a forward channel and one or more return channels, said method comprising:

designating at least one forward channel of one segment as a home carrier;

transmitting a load balancing table from the hub over the designated home carrier, wherein the load balancing table includes one or more entries corresponding to one or more segments of the system and wherein said one or more entries include information representing load on resources associated with said one or more segments of the system;

tuning at a terminal and receiving the designated home carrier;

receiving at the terminal said load balancing table transmitted over the home carrier;

selecting at the terminal one of the system segments in accordance with said load information included in said received load balancing table, wherein the selecting is performed independently and without knowledge of segment selections made by other terminals, and without transmitting a load balancing request to a hub of said satellite communication system;

selecting at the terminal a bandwidth manager from one or more bandwidth managers included in the selected system segment;

tuning at the terminal to the forward channel of the selected segment;

sending from the terminal a logon request to the hub; and selecting a traffic processing server from one or more traffic processing servers included in the selected system segment.

* * * * *